(12) United States Patent
Zhao (10) Patent No.: US 11,602,771 B2
(45) Date of Patent: Mar. 14, 2023

(54) ULTRASONIC SENSOR AND MANUFACTURING METHOD THEREFOR, AND ULTRASONIC SENSOR ARRAY AND DISPLAY DEVICE

(71) Applicant: BOE TECHNOLOGY GROUP CO., LTD., Beijing (CN)

(72) Inventor: Lei Zhao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 510 days.

(21) Appl. No.: 16/642,146

(22) PCT Filed: May 6, 2019

(86) PCT No.: PCT/CN2019/085701
§ 371 (c)(1),
(2) Date: Feb. 26, 2020

(87) PCT Pub. No.: WO2019/214584
PCT Pub. Date: Nov. 14, 2019

(65) Prior Publication Data
US 2020/0353507 A1    Nov. 12, 2020

(30) Foreign Application Priority Data
May 10, 2018    (CN) .......................... 201810445795.5

(51) Int. Cl.
*B06B 1/06* (2006.01)
*G06V 40/13* (2022.01)

(52) U.S. Cl.
CPC ........ *B06B 1/0629* (2013.01); *G06V 40/1306* (2022.01)

(58) Field of Classification Search
CPC ..... B06B 1/0629; G01D 5/48; G06V 40/1306
See application file for complete search history.

(56) References Cited

U.S. PATENT DOCUMENTS 8,288,192 B2    10/2012  Chang
8,455,963 B1     6/2013  Adler et al.
(Continued)

FOREIGN PATENT DOCUMENTS

CN      1946248 A      4/2007
CN    102015127 A      4/2011
(Continued)

OTHER PUBLICATIONS

International Search Report of PCT/CN2019/085701 in Chinese, dated Aug. 5, 2019, with English translation.
(Continued)

*Primary Examiner* — David L Singer
(74) *Attorney, Agent, or Firm* — Collard & Roe, P.C.

(57) ABSTRACT

An ultrasonic transducer and a manufacturing method thereof, an ultrasonic transducer array and a display device. The ultrasonic transducer includes a substrate, a first electrode on the substrate, an insulation layer on a side of the first electrode away from the substrate, and a second electrode on a side of the insulation layer away from the first electrode. The second electrode is disposed opposite to the first electrode, and the ultrasonic transducer further includes a through hole penetrating both the substrate and the first electrode and a chamber in the insulation layer. The chamber is opposite to the first electrode and the second electrode, respectively, the chamber is communicated with the through hole, and the second electrode is not in contact with the chamber.

9 Claims, 5 Drawing Sheets (56) References Cited

U.S. PATENT DOCUMENTS

| | | | |
|---|---|---|---|
| 2005/0200241 A1* | 9/2005 | Degertekin | B06B 1/0292 |
| | | | 310/334 |
| 2007/0154035 A1 | 7/2007 | Fukui | |
| 2007/0164632 A1* | 7/2007 | Adachi | G01N 29/2437 |
| | | | 310/311 |
| 2010/0327380 A1* | 12/2010 | Chang | B81C 1/00476 |
| | | | 257/419 |
| 2011/0026367 A1 | 2/2011 | Noelle | |
| 2014/0145275 A1 | 5/2014 | Hong | |
| 2014/0355376 A1* | 12/2014 | Schneider | G01S 7/56 |
| | | | 367/7 |
| 2016/0228915 A1* | 8/2016 | Dirksen | B06B 1/0292 |
| 2018/0101711 A1* | 4/2018 | D'Souza | G06F 21/32 |
| 2018/0122863 A1* | 5/2018 | Bok | H01L 51/5234 |
| 2018/0211088 A1* | 7/2018 | Cho | G09G 3/3233 |
| 2018/0310916 A1* | 11/2018 | Loebl | B06B 1/0292 |
| 2018/0373913 A1* | 12/2018 | Panchawagh | G01S 7/52079 |
| 2019/0179471 A1* | 6/2019 | Kim | H01L 41/1132 |
| 2019/0205603 A1* | 7/2019 | Lee | H01L 51/5284 |
| 2019/0251378 A1* | 8/2019 | Jung | B06B 1/0629 |

FOREIGN PATENT DOCUMENTS

| | | | | |
|---|---|---|---|---|
| CN | 102520032 A | | 6/2012 | |
| CN | 202853668 U | | 4/2013 | |
| CN | 203643603 U | | 6/2014 | |
| CN | 104535988 A | | 4/2015 | |
| CN | 106250834 A | * | 12/2016 | G06K 9/0002 |
| CN | 108871389 A | | 11/2018 | |
| GB | 2459866 A | | 11/2009 | |
| JP | H07-75191 A | | 3/1995 | |
| JP | 2006157320 A | * | 6/2006 | B06B 1/0292 |
| JP | 2007-124306 A | | 5/2007 | |
| JP | 2008-042869 A | | 2/2008 | |
| JP | 2018098591 A | * | 6/2018 | |
| WO | 2017/076843 A1 | | 5/2017 | |

OTHER PUBLICATIONS

Chinese Office Action in Chinese Application No. 201810445795.5, dated Jul. 24, 2019 with English translation.

\* cited by examiner

ULTRASONIC SENSOR AND MANUFACTURING METHOD THEREFOR, AND ULTRASONIC SENSOR ARRAY AND DISPLAY DEVICE

CROSS REFERENCE TO RELATED APPLICATIONS

This application is the National Stage of PCT/CN2019/085701 filed on May 6, 2019, which claims priority under 35 U.S.C. § 119 of Chinese Application No. 201810445795.5 filed on May 10, 2018, the disclosure of which is incorporated by reference.

TECHNICAL FIELD

Embodiments of the present disclosure provide an ultrasonic transducer and a manufacturing method thereof, an ultrasonic transducer array, and a display device.

BACKGROUND

Ultrasonic transducers can both transmit and receive an ultrasonic wave, and have been widely used in industrial, national defense, biomedical and other fields. Compared with traditional ultrasonic transducers that are assembled separately, capacitive micromachined ultrasonic transducers (CMUT) have the advantages of easy to form an array, high integration, strong anti-interference ability, etc., and have become a focus of attention in recent years.

SUMMARY

At least one embodiment of the present disclosure provides an ultrasonic transducer, which includes: a substrate; a first electrode located on the substrate; an insulation layer located on a side of the first electrode away from the substrate; and a second electrode located on a side of the insulation layer away from the first electrode and disposed opposite to the first electrode; the ultrasonic transducer further includes a through hole penetrating both the substrate and the first electrode and a chamber located in the insulation layer, the chamber is opposite to the first electrode and the second electrode, respectively, the chamber is in communication with the through hole, and the second electrode is not in contact with the chamber.

For example, in the ultrasonic transducer provided by an embodiment of the present disclosure, an orthographic projection of the first electrode on the substrate is at least partially overlapped with an orthographic projection of the second electrode on the substrate, an orthographic projection of the chamber on the substrate is at least partially overlapped with the orthographic projection of the first electrode on the substrate and is at least partially overlapped with the orthographic projection of the second electrode on the substrate.

For example, in the ultrasonic transducer provided by an embodiment of the present disclosure, the first electrode is at least partially exposed in the chamber.

For example, in the ultrasonic transducer provided by an embodiment of the present disclosure, the insulation layer includes: an organic insulation layer on a side of the first electrode away from the substrate; and an inorganic insulation layer on a side of the organic insulation layer away from the organic insulation layer; the chamber is located in the organic insulation layer.

For example, in the ultrasonic transducer provided by an embodiment of the present disclosure, an area of a cross section of the chamber in a plane parallel with the substrate is gradually decreased in a direction from the first electrode to the second electrode.

For example, in the ultrasonic transducer provided by an embodiment of the present disclosure, the ultrasonic transducer further includes a protective layer located on a side of the second electrode away from the substrate.

At least one embodiment of the present disclosure further provides an ultrasonic transducer array, which includes a plurality of ultrasonic transducers as described above.

For example, in the ultrasonic transducer array provided by an embodiment of the present disclosure, the plurality of the ultrasonic transducers are arranged in a matrix.

At least one embodiment of the present disclosure further provides a display device, which includes: the ultrasonic transducer array as described above; and a plurality of pixels integrated on a side of the second electrode of the ultrasonic transducer array away from the first electrode.

For example, in the display device provided by an embodiment of the present disclosure, each of the plurality of pixels includes a self-luminous structure.

For example, in the display device provided by an embodiment of the present disclosure, the pixel includes an organic electroluminescent structure.

At least one embodiment of the present disclosure further provides a manufacturing method of an ultrasonic transducer, which includes: forming a first electrode on a substrate; forming a through hole penetrating both the substrate and the first electrode; forming an insulation layer on the first electrode with the through hole formed therein, on a side of the first electrode away from the substrate; forming a second electrode on a side of the insulation layer away from the first electrode, the second electrode being disposed opposite to the first electrode; and forming a chamber in the insulation layer by using the through hole, the chamber being opposite to the first electrode and the second electrode, respectively, the chamber being in communication with the through hole, and the second electrode is not in contact with the chamber.

For example, in the manufacturing method of an ultrasonic transducer provided by an embodiment of the present disclosure, forming the chamber in the insulation layer by using the through hole includes: performing an etching process with a plasma gas on the insulation layer from a side where the substrate is located through the through hole to form the chamber in the insulation layer.

For example, in the manufacturing method of an ultrasonic transducer provided by an embodiment of the present disclosure, forming the chamber in the insulation layer by using the through hole includes: performing the etching process with at least one of $O_2$ plasma or $O_3$ plasma on the insulation layer from the side where the substrate is located through the through hole to form the chamber in the insulation layer.

For example, in the manufacturing method of an ultrasonic transducer provided by an embodiment of the present disclosure, forming the through hole penetrating both the substrate and the first electrode includes: forming the through hole penetrating both the substrate and the first electrode in the substrate and the first electrode by a laser ablation process; and performing a polishing process on both surfaces of the substrate and the first electrode with the through hole formed therein.

For example, in the manufacturing method of an ultrasonic transducer provided by an embodiment of the present disclosure, forming the insulation layer on the first electrode with the through hole formed therein, on a side of the first electrode away from the substrate includes: sequentially forming an organic insulation layer and an inorganic insulation layer on the first electrode with the through hole formed therein, on a side of the first electrode away from the substrate.

For example, in the manufacturing method of an ultrasonic transducer provided by an embodiment of the present disclosure, an orthographic projection of the first electrode on the substrate is at least partially overlapped with an orthographic projection of the second electrode on the substrate, an orthographic projection of the chamber on the substrate is at least partially overlapped with the orthographic projection of the first electrode on the substrate and is at least partially overlapped with the orthographic projection of the second electrode on the substrate.

For example, in the manufacturing method of an ultrasonic transducer provided by an embodiment of the present disclosure, the first electrode is at least partially exposed in the chamber.

For example, in the manufacturing method of an ultrasonic transducer provided by an embodiment of the present disclosure, an area of a cross section of the chamber in a plane parallel with the substrate is gradually decreased in a direction from the first electrode to the second electrode.

BRIEF DESCRIPTION OF THE DRAWINGS

Hereinafter, the drawings accompanying embodiments of the present disclosure are simply introduced in order to more clearly explain technical solution(s) of the embodiments of the present disclosure. Obviously, the described drawings below are merely related to some of the embodiments of the present disclosure without constituting any limitation thereto.

DETAILED DESCRIPTION

In order to make objectives, technical details and advantages of the embodiments of the present disclosure apparent, the technical solutions of the embodiments will be described in a clearly and fully understandable way in connection with the drawings related to the embodiments of the present disclosure. Apparently, the described embodiments are just a part but not all of the embodiments of the present disclosure. Based on the described embodiments herein, those skilled in the art can obtain other embodiment(s), without any inventive work, which should be within the scope of the present disclosure.

Unless otherwise defined, all the technical and scientific terms used herein have the same meanings as commonly understood by one of ordinary skill in the art to which the present disclosure belongs. The terms "first," "second," etc., which are used in the present disclosure, are not intended to indicate any sequence, amount or importance, but distinguish various components. Also, the terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly.

Figure 1:
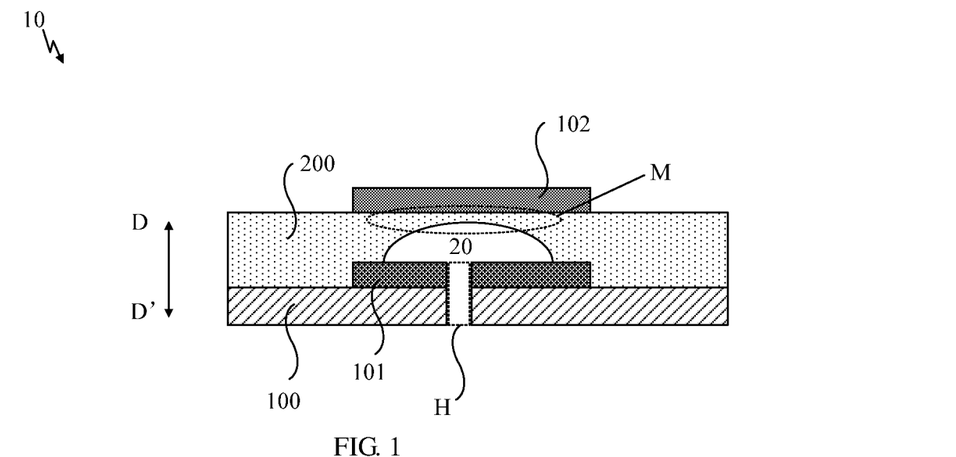
FIG. 1 is a schematic structural view illustrating an ultrasonic transducer provided by an embodiment of the present disclosure.

An embodiment of the present disclosure provides an ultrasonic transducer. FIG. 1 is a schematic structural view illustrating a capacitive micromachined ultrasonic transducer (CMUT) provided by an embodiment of the present disclosure. As illustrated by FIG. 1, the ultrasonic transducer 10 includes a substrate 100, a first electrode 101, an insulation layer 200 and a second electrode 102. The insulation layer 200 is located on a side of the first electrode 101 away from the substrate 100. The second electrode 102 is located on a side of the insulation layer 200 away from the first electrode 101 and is opposite to the first electrode 101. The ultrasonic transducer 10 further includes a through hole H penetrating both the substrate 100 and the first electrode 101 and a chamber 20 located in the insulation layer 200. The chamber 20 is opposite to the first electrode 101 and the second electrode 102, respectively, the chamber 20 is in communication with the through hole H, and the second electrode 102 is not in contact with the chamber 20.

For example, as illustrated by FIG. 1, the ultrasonic transducer 10 includes: a substrate 100, a first electrode 101 and a second electrode 102 that are located on the substrate 100 and oppositely disposed, and an insulation layer 200 located between the first electrode 101 and the second electrode 102. The first electrode 101 is closer to the substrate 100 than the second electrode 102. The ultrasonic transducer 10 further includes: a through hole H penetrating both the substrate 100 and the first electrode 101 in a thickness direction D-D', and a chamber 20 located in the insulation layer 200 corresponding to a position of the first electrode 101 and the second electrode 102. The chamber 20 is in communication with the through hole H. The second electrode 102 is not in contact with the chamber 20.

In the ultrasonic transducer 10 provided by the embodiment of the present disclosure, the chamber 20 located in the insulation layer 200 is not in contact with the second electrode 102, that is, a part of the insulation layer 200 is still left between the chamber 20 and the second electrode 102. This part of the insulation layer constitutes a vibration film M (referring to FIG. 1) in the ultrasonic transducer 10, so that in the case where an AC voltage of a certain frequency is applied to the first electrode and the second electrode, the vibration film M will vibrate up and down, thereby generating an ultrasonic wave (in this case, the ultrasonic transducer is used as an ultrasonic transmitting unit); or, after a DC bias voltage is applied to the first electrode and the second electrode, the vibration film M will vibrate under an action of an external ultrasonic wave, and a capacitance value of a capacitor formed by the two electrodes will change with the vibration of the vibration film M, thereby generating a detectable electrical signal (in this case, the ultrasonic transducer is used as an ultrasonic receiving unit).

In summary, the ultrasonic transducer provided by the embodiment of the present disclosure is provided with a through hole that penetrates both the substrate and the first electrode in a thickness direction, and a chamber located in the insulation layer between the first electrode and the second electrode, and the through hole is in communication with the chamber. In an actual manufacturing method, the above-mentioned chamber may be formed through the through hole, for example, the ultrasonic transducer in the present disclosure is formed by etching the insulation layer by a plasma gas by using the through hole; a part of the insulation layer between the chamber and the second electrode constitutes a vibration film, thereby enabling ultrasonic sensing including ultrasonic transmission and ultrasonic reception.

For example, in some exemplary embodiments, as illustrated by FIG. 1, an orthographic projection of the first electrode 101 on the substrate 100 is at least partially overlapped with an orthographic projection of the second electrode 102 on the substrate 100. An orthographic projection the chamber 20 on the substrate 100 is at least partially overlapped with the orthographic projection of the first electrode 101 on the substrate 100 and is at least partially overlapped with the orthographic projection of the second electrode 102 on the substrate 100.

For example, in some exemplary embodiments, as illustrated by FIG. 1, the first electrode 101 is at least partially exposed in the chamber 20.

For example, in some exemplary embodiments, as illustrated by FIG. 1, in a direction from the first electrode 101 to the second electrode 102, an area of a cross section of the chamber 20 in a plane parallel with the substrate 100 is gradually decreased. Of course, the embodiments of the present disclosure include, but are not limited thereto. A shape of the cross section of the chamber 20 located in the insulation layer 200 in the plane perpendicular to the substrate 100 may also be other shapes, such as square, circular, oval shape, etc., in practice, may be selected according to the needs and the manufacturing process.

For example, in some exemplary embodiments, the insulation layer 200 includes: an organic insulation layer 201 on a side of the first electrode 101 away from the substrate 100; and an inorganic insulation layer 202 on a side of the organic insulation layer 201 away from the substrate 100, the chamber 20 is located in the organic insulation layer 201. On one hand, the inorganic insulation layer 202 is employed to improve an adhesion force between the electrode (including the first electrode 101 and the second electrode 102) and the organic insulation layer 201. On the other hand, in the case where a predetermined plasma gas is used to etch the insulation layer 200, the plasma gas can etch the organic insulation layer 201 without etching the inorganic insulation layer 202, thereby facilitating process control.

Figure 2:
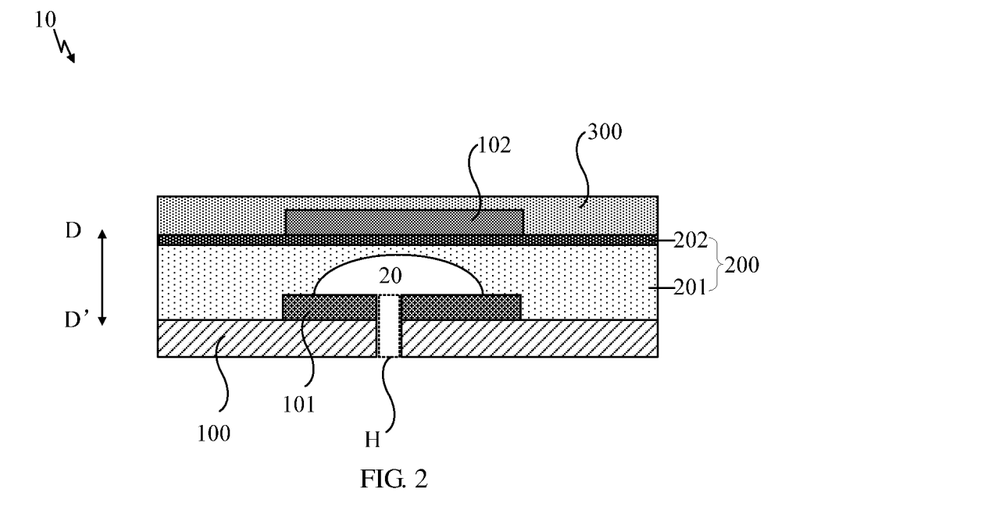
FIG. 2 is a schematic structural view illustrating another ultrasonic transducer provided by an embodiment of the present disclosure.

For example, in some exemplary embodiments, the insulation layer 200 provided with the chamber 20 is generally formed of an organic material, such as resin; and the electrodes (including the first electrode 101 and the second electrode 102) are generally made of a metal material. In this case, for the second electrode 102, if it is in direct contact with the insulation layer of the organic material, an adhesion force between the second electrode and the insulation layer of the organic material is relatively small, which is prone to generate delamination and other undesirable phenomena. Therefore, in some exemplary embodiments, as illustrated by FIG. 2, the above-mentioned insulation layer 200 may include: an organic insulation layer 201 and an inorganic insulation layer 202 which are sequentially arranged in a thickness direction D-D', the inorganic insulation layer 202 is closer to the second electrode 102 than the organic insulation layer 201, and the chamber is located in the organic insulation layer 201; in this case, the second electrode 102 is connected with the organic insulation layer 201 through the inorganic insulation layer 202. Because the inorganic insulation layer 202 has a better adhesion force with the second electrode 102 and the organic insulation layer 201, respectively, thereby increasing an overall bonding effect. In addition, the inorganic insulation layer 202 can also prevent water and oxygen in the organic insulation layer 201 from eroding the second electrode 102.

Of course, the embodiments of the present disclosure include but are not limited thereto. The material of the second electrode 102 can be adjusted according to actual situation as long as a sufficient adhesion force is provided between the second electrode 102 and the insulation layer 200, for example, only a single-layer insulation layer is provided (referring to the arrangement in FIG. 1).

In addition, it should also be understood that, in the case where the insulation layer 200 includes the organic insulation layer 201 and the inorganic insulation layer 202, the chamber 20 located in the organic insulation layer 201 may not fully penetrate the organic insulation layer 201 as illustrated by FIG. 2; the chamber 20 can also penetrate the organic insulation layer 201, but does not penetrate the inorganic insulation layer 202; the present disclosure is not limited thereto, as long as a part of the insulation layer 200 remains between the chamber 20 and the second electrode 102 to constitute a vibration film.

For example, in some exemplary embodiments, as illustrated by FIG. 2, the ultrasonic transducer further includes a protective layer 300 on a side of the second electrode 102 facing away from the substrate 100 to protect the second electrode 102 from a damage caused by a human factor or an environmental factor to avoid adverse influence on ultrasonic sensing of an entire ultrasonic transducer.

An embodiment of the present disclosure further provides an ultrasonic transducer array, which includes a plurality of ultrasonic transducers as described above, and has the same structure and beneficial effects as the ultrasonic transducers provided by the foregoing embodiments. Because the structure and beneficial effects of the ultrasonic transducer have been described in detail in the foregoing embodiments, details are not described herein.

Figure 3:
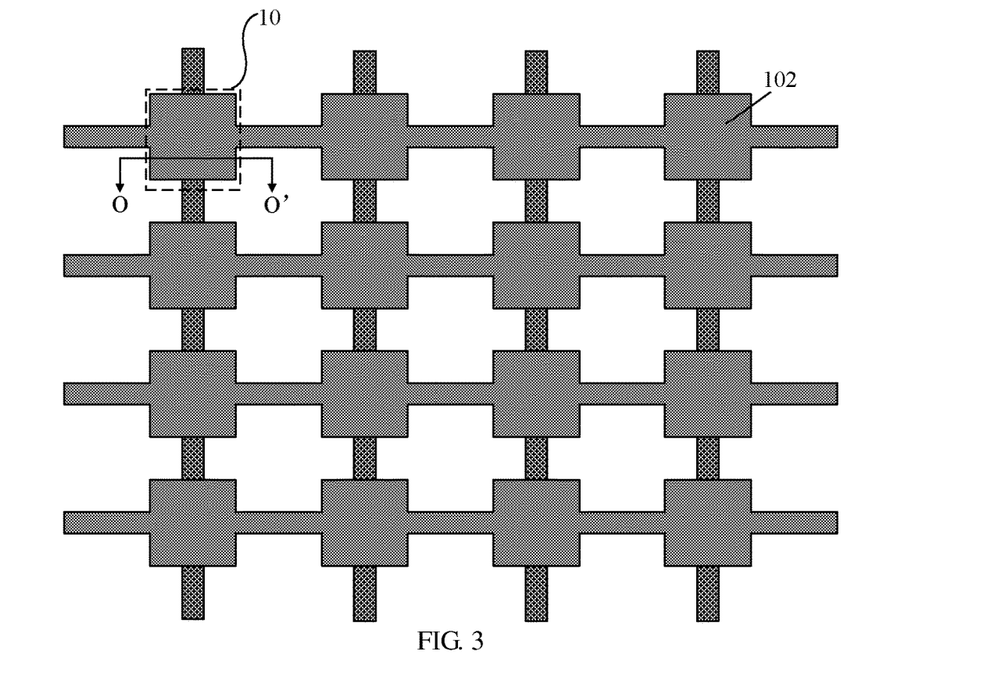
FIG. 3 is a schematic structural view illustrating an ultrasonic transducer provided by an embodiment of the present disclosure.

For example, in order to improve the integration degree of the ultrasonic transducers in the ultrasonic transducer array, as illustrated by FIG. 3 (a cross-sectional view taken along line O-O' in FIG. 3 is FIG. 2), a plurality of ultrasonic transducers 10 are arranged in a matrix on the substrate 100.

Those skilled in the art should understand that in order to simplify the process and reduce the manufacturing cost, the plurality of ultrasonic transducers 10 arranged in a matrix on the substrate are generally manufactured by the same manufacturing process; that is, the first electrodes of all ultrasonic transducers are in the same layer and made of the same material by the same patterning process; similarly, the second electrodes are in the same layer and made of the same material by the same patterning process; the through holes H in all ultrasonic transducers are also made by the same process, and the chambers 20 are also formed by the same manufacturing process.

For example, in some exemplary embodiments, in order to facilitate the control of the above-mentioned ultrasonic transducers 10 arranged in a matrix and the reading of related signals, referring to FIG. 3, the second electrodes 102 in the ultrasonic transducers 10 of the same row are connected in sequence, and the first electrodes 101 (located below the second electrode 102, not illustrated in FIG. 3, referring to FIG. 2) in the ultrasonic transducers 10 of the same column are connected in sequence. Of course, it can also be provided that the first electrodes 101 in the ultrasonic transducer 10 of the same row are connected in sequence, and the second electrodes 102 in the ultrasonic transducers 10 of the same column are connected in sequence. For the actual signal driving process, signal reading and other related processes, as well as the arrangement of other related devices (such as an IC), may be referred to the common ultrasonic transducer array, without repeated herein.

For example, in some exemplary embodiments, the ultrasonic transducer array may be applied in the display field to implement at least one of touch or fingerprint identification. Of course, the embodiments of the present disclosure include, but are not limited thereto, the ultrasonic transducer array may be applied to the fields of distance measurement, object surface detection, flaw detection, and the like.

Figure 4:
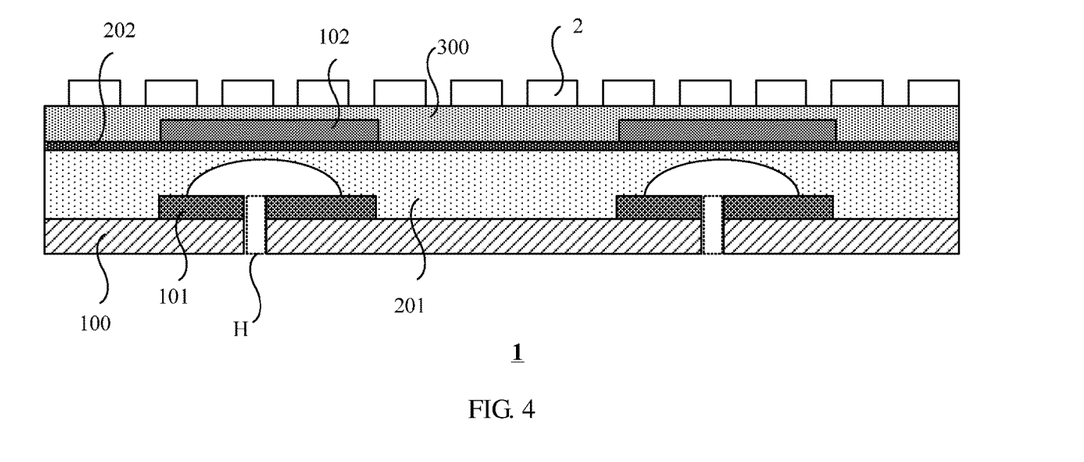
FIG. 4 is a schematic structural view illustrating a display device provided by an embodiment of the present disclosure.

At least one embodiment of the present disclosure also provides a display device. FIG. 4 is a schematic view illustrating a display device provided by an embodiment of the present disclosure. As illustrated by FIG. 4, the display device includes the above-mentioned ultrasonic transducer array 1 and a plurality of pixels 2 integrated on a side of the second electrode 102 of the ultrasonic transducer array 1 away from the first electrode 101. That is, the ultrasonic transducer array may be integrated in a display device, and thus can be used to implement at least one of touch control or fingerprint identification. For example, in some exemplary embodiments, the pixel 2 includes a self-luminous structure. Therefore, there is no need to provide a backlight module in the display device, thereby facilitating the integration of the above-mentioned ultrasonic transducer array with the pixels.

For example, in some exemplary embodiments, the pixel 2 described above includes an organic electroluminescent structure.

For example, in some exemplary embodiments, the display device includes the above-mentioned ultrasonic transducer array, that is, in this case, the ultrasonic transducer array can be used in application fields such as fingerprint identification and touch operation, and can be combined with the display device. The display device has the same structure and advantageous effects as the ultrasonic transducer provided by the foregoing embodiments, without repeated herein because the structure and beneficial effects of the ultrasonic transducer have been described in detail in the foregoing embodiments.

It should be explained that, in the embodiment of the present disclosure, the display device may specifically include at least a liquid crystal display (LCD) panel and a self-luminous display panel such as an Organic Light-Emitting Diode (OLED) display panel, and the display panel may be applied to any products or components having display function such as a liquid crystal display, an LCD TV, a digital photo frame, mobile phone or tablet, etc. For example, in some exemplary embodiments, the above display device includes self-luminous units (for example, including OLEDs) arranged in a matrix, the self-luminous units are integrated on a side of the second electrode of the ultrasonic transducer facing away from the first electrode; that is, the self-luminous units in the display device are directly integrated on the ultrasonic transducer (for touch or fingerprint identification), that is, the ultrasonic transducer is used as a back plate of the display device (for example, it can be used as a back plate of the LTPS-AMOLED), and is connected with the display devices as a whole, thereby improving the functional integration of the entire device.

Figure 5:
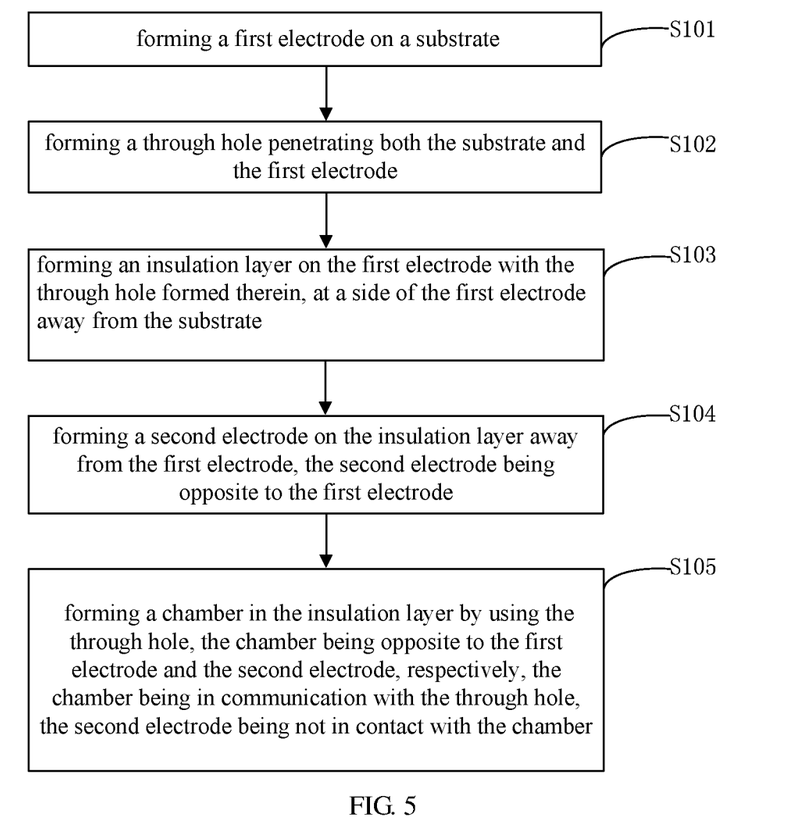
FIG. 5 is a flowchart of a manufacturing method of an ultrasonic transducer provided by an embodiment of the present disclosure.

An embodiment of the present disclosure further provides a manufacturing method of an ultrasonic transducer. As illustrated by FIG. 5, the method includes the following steps S101-S105.

Figure 6:
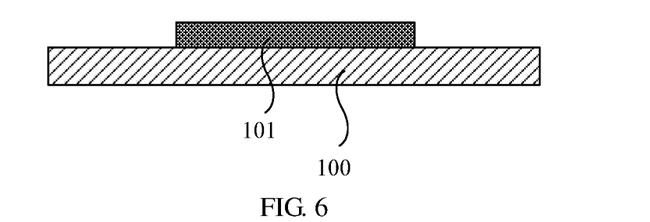
FIG. 6 is one of schematic structural views illustrating a manufacturing method of an ultrasonic transducer provided by an embodiment of the present disclosure.

Step S101: as illustrated by FIG. 6, forming a first electrode 101 on a substrate 100.

For example, before forming the first electrode 101, the method may include cleaning the substrate 100, and then forming a metal film layer on the substrate 100 by using a metal material (Mo, Al, Ti, Nd, Nb, Ni, Ag, etc.) in a deposition manner, and forming the first electrode 101 by a patterning process.

For example, the first electrode 101 formed above may have a thickness in a range from 100 nm to 1000 nm, and may have an area in a range from 10 μm×10 μm to 500 μm×500 μm.

It should be explained that, firstly, in the present disclosure, a patterning process may include a photolithography process, or include a photolithography process and an etching process, and may also include other methods for forming a predetermined pattern such as a printing process, an inkjet process etc., the photolithography process refers to processes including film formation, exposure, and development for forming patterns using photoresist, mask, exposure machine, etc. Secondly, the substrate 100 may be a glass substrate, a silicon substrate (Si Wafer), or a plastic substrate, without limited thereto in the present disclosure. In practice, a substrate of an appropriate material may be selected.

Figure 7:
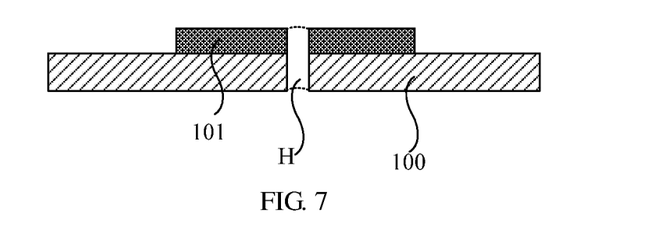
FIG. 7 is one of schematic structural views illustrating a manufacturing method of an ultrasonic transducer provided by an embodiment of the present disclosure.

Step S102: as illustrated by FIG. 7, forming a through hole H penetrating both the substrate 100 and the first electrode 101 on the substrate 100 with the first electrode 101 formed thereon.

For example, a through hole H penetrating both the substrate 100 and the first electrode 101 may be formed on the substrate 100 on which the first electrode 101 is formed by a laser ablation process.

For example, a diameter Φ of the through hole H may be in a range of 10 μm to 500 μm.

For example, in some exemplary embodiments, forming the through hole penetrating both the substrate and the first electrode includes: forming the through hole penetrating both the substrate and the first electrode in both the substrate and the first electrode by a laser ablation process; and performing a polishing process on both surfaces of the substrate and the first electrode with the through hole formed therein. During forming the through hole H by a laser ablation process, it is easy to cause recondensation of the molten material, resulting in uneven surface of the substrate, which affects a subsequent manufacturing process. Therefore, when the through hole H is formed by a laser ablation process, preferably, after forming the through hole H, the method further includes: performing a polishing process on both surfaces of the substrate 100 with the through hole H formed therein to planarize the substrate again.

Of course, the laser ablation process is only a preferred method for forming the through hole H, without limited thereto in the present disclosure; the above-mentioned through hole may also be formed by other methods, for example, a wet etching process may be used; it should be understood in the case where the through hole H is formed by a wet etching process, there is no need to provide a subsequent double-side polishing process, but the substrate 100 on which the first electrode 101 is formed should be protected on both sides before the etching process is performed.

Figure 8A:
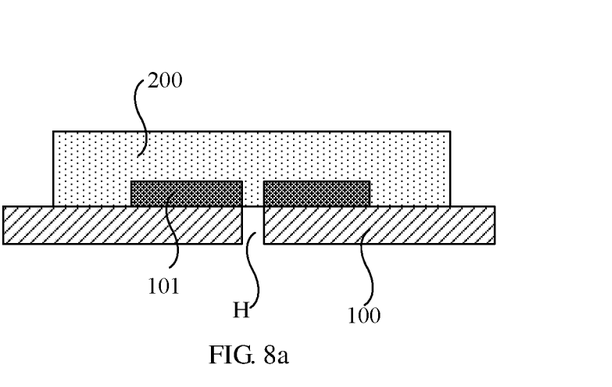
FIG. 8a is one of schematic structural views illustrating a manufacturing method of an ultrasonic transducer provided by an embodiment of the present disclosure.
Figure 8B:
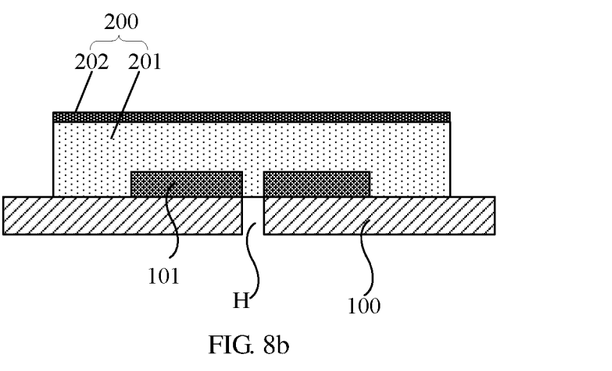
FIG. 8b is one of schematic structural views illustrating a manufacturing method of an ultrasonic transducer provided by an embodiment of the present disclosure.

Step S103: as illustrated by FIG. 8a or 8b, forming an insulation layer 200 on the first electrode 101 with the through hole H formed therein.

For example, taking the insulation layer 200 illustrated in FIG. 8b as an example, forming an organic insulation layer 201 on the first electrode 101 having the through hole H formed therein by using a resin material by a coating process; and then forming an inorganic insulation layer 202 on the organic insulation layer 201 by using an inorganic insulation material such as SixOy, SixNy, SixOyNz, AlxOy, or TixOy, etc., of course, this step may be not performed according to actual needs, referring to FIG. 8a).

For example, a thickness of the formed organic insulation layer 201 may be in a range from 10 μm to 200 μm, and a thickness of the inorganic insulation layer 202 may be in a range from 100 nm to 1000 nm.

Figure 9:
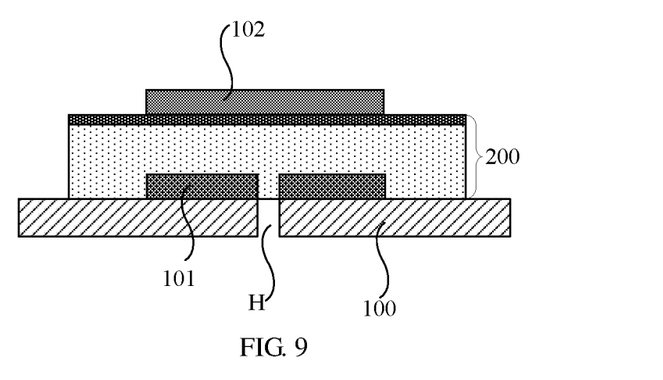
FIG. 9 is one of schematic structural views illustrating a manufacturing method of an ultrasonic transducer provided by an embodiment of the present disclosure.

Step S104: as illustrated by FIG. 9, forming a second electrode 102 opposite to the first electrode 101 on the substrate 100 on which the insulation layer 200 is formed.

For example, the second electrode 102 may be formed by forming a metal film layer on the substrate 100 on which the insulation layer 200 is formed in a deposition manner by using a metal material (Mo, Al, Ti, Nd, Nb, Ni, Ag, etc.), and then performing a patterning process.

For example, the formed second electrode 102 may have a thickness in a range from 100 nm to 1000 nm, and may have an area in a range from 10 μm×10 μm to 500 μm×500 μm.

Figure 10:
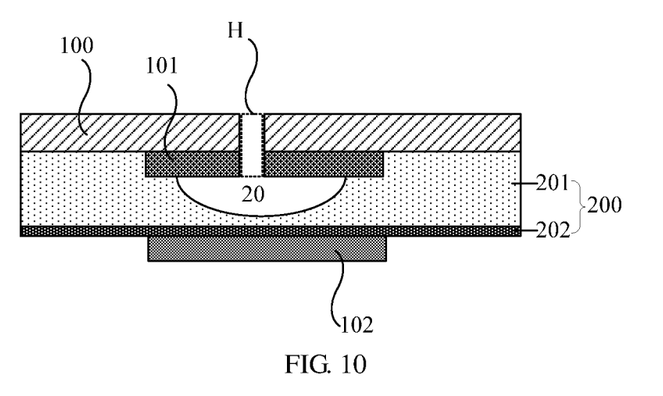
FIG. 10 is one of schematic structural views illustrating a manufacturing method of an ultrasonic transducer provided by an embodiment of the present disclosure.

Step S105: as illustrated by FIG. 10, forming a chamber 20 in the insulation layer 200 by using the through hole H, the chamber 20 being opposite to the first electrode 101 and the second electrode 102, respectively, the chamber 20 being in communication with the through hole H, the second electrode 102 being not in contact with the chamber 20. That is, the chamber 20 is formed in the insulation layer 200 at a position of the through hole H of a back surface of the substrate 100 on which the insulation layer 200 is formed, and the chamber 20 does not fully penetrate the insulation layer 200 to form a vibration film.

For example, in some exemplary embodiments, forming the chamber in the insulation layer by using the through hole includes: performing an etching process with a plasma gas on the insulation layer from a side where the substrate is located through the through hole to form the chamber in the insulation layer.

For example, at least one of $O_2$ plasma or $O_3$ plasma is used to etch the insulation layer from the side where the substrate is located through the through hole to form the chamber in the insulation layer. For example, the chamber 20 is formed by etching the insulation layer 200 at a position of the through hole H on a back surface of the substrate 100 on which the insulation layer 200 is formed, by using at least one of $O_2$ plasma or $O_3$ plasma. In the case where the insulation layer 200 includes an organic insulation layer 201 and an inorganic insulation layer 202, in general, the chamber 20 may be formed only in the organic insulation layer 201, while the inorganic insulation layer 202 remains without being etched.

For example, a diameter Φ of the chamber 20 may be in a range from 10 μm to 500 μm.

It should be explained that, for the single-layer insulation layer 200 illustrated in FIG. 8a, it is necessary to ensure that the chamber 20 formed by step S105 does not fully pass through the single-layer insulation layer 200. In the case where the insulation layer 200 includes the organic insulation layer 201 and the inorganic insulation layer 202 as illustrated by FIG. 8b, the chamber 20 formed in step S105 may not penetrate the organic insulation layer 201 as illustrated by FIG. 10; it may also penetrate the organic insulation layer 201 while do not penetrate the inorganic insulation layer 202, without limited thereto in the present disclosure, as long as a part of the insulation layer 200 remains between the chamber 20 and the second electrode 102 to constitute a vibration film.

For example, in some exemplary embodiments, an orthographic projection of the first electrode on the substrate is at least partially overlapped with an orthographic projection of the second electrode on the substrate, and an orthographic projection of the chamber on the substrate is overlapped with the orthographic projection of the first electrode on the substrate and is at least partially overlapped with the orthographic projection of the second electrode on the substrate.

For example, in some exemplary embodiments, the first electrode is at least partially exposed in the chamber.

For example, in some exemplary embodiments, an area of a cross-section of the chamber in a plane parallel with the substrate is gradually decreased in a direction from the first electrode to the second electrode.

In addition, in order to avoid damage to the second electrode 102 due to a human factor or an environmental factor, it is preferable in practice to form a protective layer 300 after forming the second electrode 102 in the step S104 (referring to FIG. 2); the protective layer 300 may adopt SixOy, SixNy, SixOyNz, AlxOy or TixOy.

It should be understood that the serial numbers of the above-mentioned manufacturing steps do not necessarily refer to a sequential manufacturing relationship; for example, in the present disclosure, the sequence of a step of forming the protective layer 300 and the aforementioned step 105 of forming the chamber 20 is not limited, and the method may include forming the protective layer 300 firstly, and then forming the chamber 20; or include forming the chamber 20 firstly, and then forming the protective layer 300.

For another example, for step S104 of forming the second electrode 102 and step S105 of forming the chamber 20, step S104 may be performed firstly to form the second electrode 102, and then step S105 may be performed to form the chamber 20; or step S105 may be performed firstly to form the chamber 20, and then step S104 is performed to form the second electrode 102.

In summary, in the present disclosure, by forming a through hole penetrating both a substrate and a first electrode in a thickness direction, and then forming a chamber in the insulation layer between the first electrode and the second electrode through the through hole to form an ultrasonic transducer, thereby realizing ultrasonic sensing including ultrasonic transmission and ultrasonic reception.

It should be understood that, with the manufacturing method of the ultrasonic transducer in the present disclosure, a size of the chamber may be adjusted by controlling the process, and a size of the ultrasonic transducer may also be controlled by using the patterning process described above.

In addition, for other related contents in the manufacturing method, corresponding reference may be made to the ultrasonic transducer and corresponding parts in the foregoing embodiments of the ultrasonic transducer, without repeated herein. For the ultrasonic transducer and other arrangement structures in the ultrasonic transducer provided by the foregoing embodiments, the foregoing manufacturing method may be referred correspondingly, the corresponding manufacturing steps may be adjusted, without repeated herein.

The following should be explained.

(1) The accompanying drawings involve only the structure(s) in connection with the embodiment(s) of the present disclosure, and other structure(s) may be referred to common design(s).

(2) In case of no conflict, features in one embodiment or in different embodiments may be combined.

The above are only specific implementations of the present disclosure, the protection scope of the present disclosure is not limited thereto. Any changes or substitutions easily occur to those skilled in the art within the technical scope of the present disclosure should be covered in the protection scope of the present disclosure. Therefore, the protection scope of the present disclosure should be based on the protection scope of the claims.

What is claimed is:

1. A manufacturing method of an ultrasonic transducer comprising:
   forming a first electrode on a substrate;
   forming a through hole penetrating both the substrate and the first electrode;
   forming an insulation layer on the first electrode with the through hole formed therein, on a side of the first electrode away from the substrate;
   forming a second electrode on a side of the insulation layer away from the first electrode, the second electrode being disposed opposite to the first electrode; and
   forming a chamber in the insulation layer by using the through hole, the chamber being opposite to the first electrode and the second electrode, respectively, the chamber being in communication with the through hole, and the second electrode is not in contact with the chamber.

2. The manufacturing method of the ultrasonic transducer according to claim 1, wherein forming the chamber in the insulation layer by using the through hole comprises:
   performing an etching process with a plasma gas on the insulation layer from a side where the substrate is located through the through hole to form the chamber in the insulation layer.

3. The manufacturing method of the ultrasonic transducer according to claim 2, wherein forming the chamber in the insulation layer by using the through hole comprises:
   performing the etching process with at least one of $O_2$ plasma or $O_3$ plasma on the insulation layer from the side where the substrate is located through the through hole to form the chamber in the insulation layer.

4. The manufacturing method of the ultrasonic transducer according to claim 1, wherein forming the through hole penetrating both the substrate and the first electrode comprises:
   forming the through hole penetrating both the substrate and the first electrode in the substrate and the first electrode by a laser ablation process; and
   performing a polishing process on both surfaces of the substrate and the first electrode with the through hole formed therein.

5. The manufacturing method of the ultrasonic transducer according to claim 1, wherein forming the insulation layer on the first electrode with the through hole formed therein, on a side of the first electrode away from the substrate comprises:
   sequentially forming an organic insulation layer and an inorganic insulation layer on the first electrode with the through hole formed therein, on a side of the first electrode away from the substrate.

6. The manufacturing method of the ultrasonic transducer according to claim 1, wherein an orthographic projection of the first electrode on the substrate is at least partially overlapped with an orthographic projection of the second electrode on the substrate, an orthographic projection of the chamber on the substrate is at least partially overlapped with the orthographic projection of the first electrode on the substrate and is at least partially overlapped with the orthographic projection of the second electrode on the substrate.

7. The manufacturing method of the ultrasonic transducer according to claim 1, wherein the first electrode is at least partially exposed in the chamber.

8. The manufacturing method of the ultrasonic transducer according to claim 1, wherein an area of a cross section of the chamber in a plane parallel with the substrate is gradually decreased in a direction from the first electrode to the second electrode.

9. The manufacturing method of the ultrasonic transducer according to claim 1, further comprising:
   forming a protective layer on a side of the second electrode away from the substrate.

* * * * *